(12) United States Patent
Yourist

(10) Patent No.: US 8,906,276 B2
(45) Date of Patent: Dec. 9, 2014

(54) EXTRUSION BLOW MOLDED PET CONTAINER AND METHOD OF MAKING

(75) Inventor: Sheldon E. Yourist, York, PA (US)

(73) Assignee: Graham Packaging Company, L.P.

( * ) Notice: Subject to any disclaimer, the term of this patent is extended or adjusted under 35 U.S.C. 154(b) by 596 days.

(21) Appl. No.: 12/401,716

(22) Filed: Mar. 11, 2009

(65) Prior Publication Data

US 2010/0230379 A1  Sep. 16, 2010

(51) Int. Cl.
*B29C 49/04* (2006.01)
*B65D 1/02* (2006.01)
*B29K 67/00* (2006.01)
*B29L 31/00* (2006.01)

(52) U.S. Cl.
CPC ............ *B29C 49/04* (2013.01); *B29K 2067/00* (2013.01); *B65D 1/0223* (2013.01); *B65D 2501/0081* (2013.01); *B29L 2031/7158* (2013.01)
USPC ............ 264/161; 264/523; 264/536; 264/540

(58) Field of Classification Search
None
See application file for complete search history.

(56) References Cited

U.S. PATENT DOCUMENTS

| | | | |
|---|---|---|---|
| 4,145,466 A * | 3/1979 | Leslie et al. | 428/36.92 |
| 5,037,684 A * | 8/1991 | Dundas et al. | 428/36.92 |
| 5,057,266 A | 10/1991 | Belcher | |
| 5,087,406 A * | 2/1992 | Krall et al. | 264/512 |
| D337,921 S | 8/1993 | Iodice | |
| 5,320,231 A | 6/1994 | Iodice | |
| 5,353,954 A * | 10/1994 | Steward et al. | 220/608 |
| D353,331 S | 12/1994 | Larkin et al. | |
| D385,748 S | 11/1997 | Iodice et al. | |
| D464,139 S | 10/2002 | Iodice | |
| D470,593 S | 2/2003 | Iodice | |
| 2007/0068897 A1 | 3/2007 | Miller et al. | |

* cited by examiner

*Primary Examiner* — Monica Huson
(74) *Attorney, Agent, or Firm* — Baker Botts, L.L.P.

(57) ABSTRACT

A plastic container that is fabricated from an extrudable polyethylene terephthalate (PET) using an extrusion blow molding process includes a neck portion, a bottom portion and a main body portion. The main body portion has a central opening that extends completely through the main body portion and may have generally toroidal area surrounding the central opening. The bottom portion includes a plurality of support feet and a substantially smooth central raised portion that has substantially no discontinuities such as the gate well that is commonly found on PET containers fabricated using the conventional stretch blow molding process. The neck portion may be offset from a longitudinal axis of the container so as to facilitate pouring by a consumer.

17 Claims, 5 Drawing Sheets

EXTRUSION BLOW MOLDED PET CONTAINER AND METHOD OF MAKING

BACKGROUND OF THE INVENTION

1. Field of the Invention

This invention relates generally to plastic containers that are fabricated from polyethylene terephthalate, which is commonly known by the acronym PET. More specifically, the invention relates to PET containers that are fabricated using an extrusion blow molding process.

2. Description of the Related Technology

Many products that were previously packaged using glass containers are now being supplied in plastic containers, such as containers that are fabricated from polyesters such as polyethylene terephthalate (PET).

PET containers are typically manufactured using the well-known stretch blow molding process. This involves the use of a pre-molded PET preform having a threaded portion and a closed distal end. The preform is first heated and then is longitudinally stretched and subsequently inflated within a mold cavity so that it assumes the desired final shape of the container. As the preform is inflated, it elongates and stretches, taking on the shape of the mold cavity. The polymer solidifies upon contacting the cooler surface of the mold, and the finished hollow container is subsequently ejected from the mold.

Another conventional process for fabricating plastic containers is the extrusion blow molding process, in which a continuously extruded hot plastic tube or parison is captured within a mold and inflated against the inner surfaces of the mold to form a container blank. The mold is typically designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion.

The extrusion blow molding process is typically used to form containers that are fabricated from material such as polyolefin or polyethylene. It is not conventionally used for fabricating materials out of PET, although an extrudable PET material has recently been made commercially available.

The stretch blow molding process is the industry standard for forming PET containers that are used to package consumer beverages as well as other materials. However, it has some inherent limitations. These include unsightly gate wells or discontinuities on the bottom portions of containers, and limitations on the possible spectrum of designs that can be realized using the stretch blow molding process.

A need exists for an improved PET plastic container that obviates some of the disadvantages that are inherent to containers that are fabricated using the stretch blow molding process.

SUMMARY OF THE INVENTION

Accordingly, it is an object of the invention to provide an improved PET plastic container that obviates some of the disadvantages that are inherent to containers that are fabricated using the stretch blow molding process.

In order to achieve the above and other objects of the invention, a plastic container, according to a first aspect of the invention includes a neck portion; a bottom portion; and a main body portion that is unitary with the neck portion and the bottom portion. The main body portion has a sidewall that is shaped so as to define a central opening that extends completely through the main body portion, and the main body portion is fabricated from a material comprising polyethylene terephthalate (PET).

A plastic container according to a second aspect of the invention includes a neck portion; a main body portion and a bottom portion. The bottom portion includes a plurality of feet that are adapted to support the plastic container on an underlying flat horizontal surface and a substantially smooth central raised portion. The main body portion is unitary with the neck portion and the bottom portion. The bottom portion and the main body portion are fabricated from a material comprising polyethylene terephthalate (PET) using an extrusion blow molding process.

A method of making a plastic container according to a third aspect of the invention includes steps of continuously extruding a parison that is fabricated from a material comprising polyethylene terephthalate (PET); capturing a portion of the parison within a mold; inflating the captured portion of the parison against the mold to form a container blank that has a main body portion having a central recess that is closed with flash; and trimming the flash from the container blank so as to form a PET container having a main body portion with a sidewall that is shaped so as to define a central opening that extends completely therethrough.

According to a fourth aspect of the invention, a method of making a plastic container includes steps of continuously extruding a parison that is fabricated from a material comprising polyethylene terephthalate (PET); capturing a portion of said parison within a mold; inflating the captured portion of the parison against the mold to form a container blank that has a main body portion and a bottom portion comprising a plurality of feet that are adapted to support the a plastic container on an underlying flat horizontal surface and flash; and trimming the flash from the container blank so as to form a PET container having a bottom portion having a substantially smooth central raised portion body portion.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
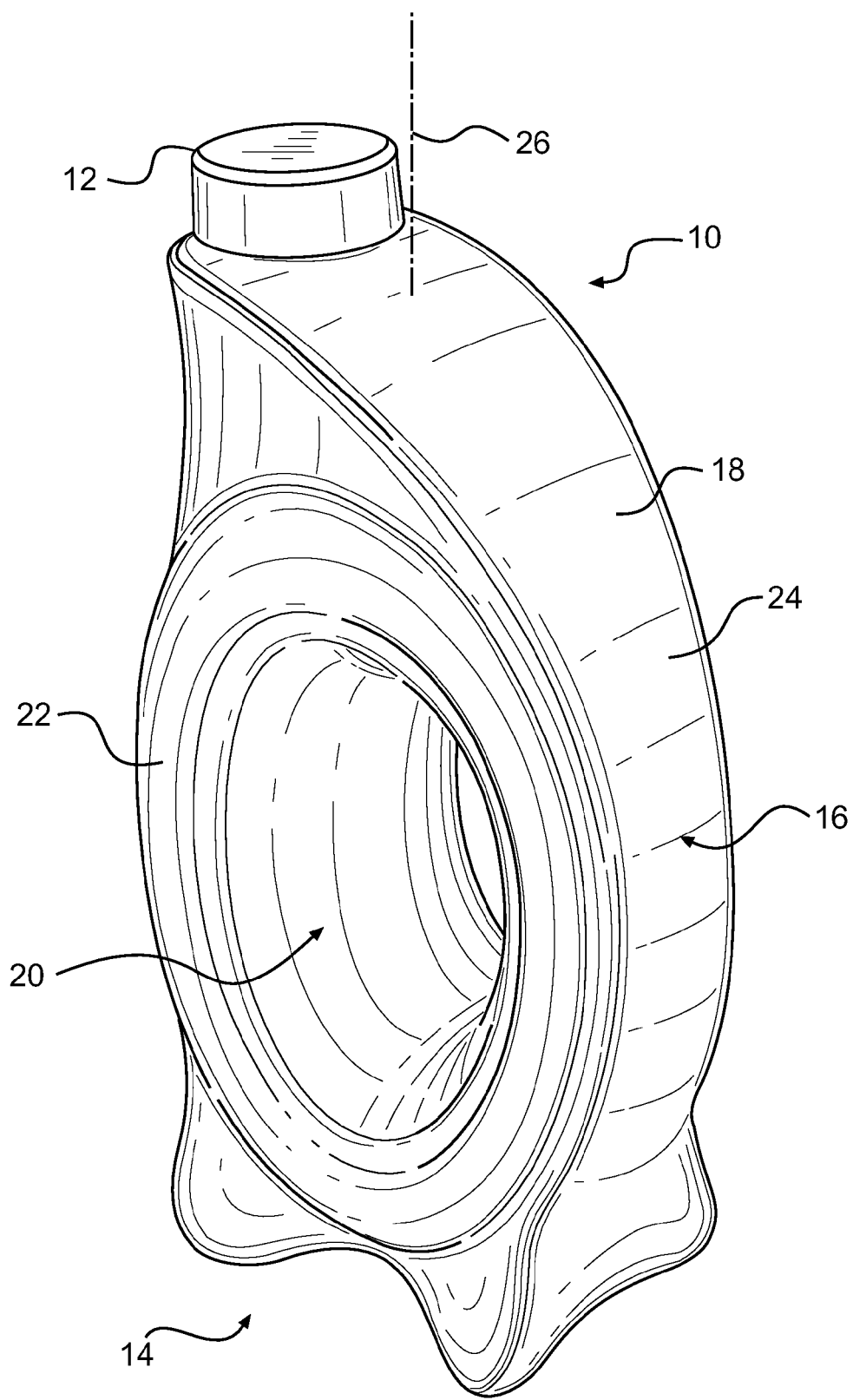
FIG. 1 is a perspective view of a container that is constructed according to a preferred embodiment of the invention.

Referring now to the drawings, wherein like reference numerals designate corresponding structure throughout the views, and referring in particular to FIG. 1, a plastic container 10 that is constructed according to a preferred embodiment of the invention includes a neck portion 12 that includes an opening that is in communication with an interior of the container 10. Neck portion 12 is preferably threaded so as to be adapted to receive an internally threaded closure cap. Alternatively, neck portion 12 may be provided with structure that is adapted to receive a closure cap that prohibits removal of the closure cap by a consumer. Such structure is well known in this area of technology.

Container 10 includes a bottom portion 14 that will be described in greater detail below, and a main body portion 16 that is unitary with both the neck portion 12 and the bottom portion 14. The main body portion 16 preferably includes a sidewall 18 that is shaped so as to define a central opening 20 that extends completely through the main body portion 16.

The entire container 10, including the neck portion 12, the bottom portion 14 and the main body portion 16 is preferably fabricated as a single unitary piece from an extrudable polyethylene terephthalate (PET) material, such as that which is commercially available from Eastman Chemical Company under the brand name EBO62 or AMPHORA.

Figure 2:
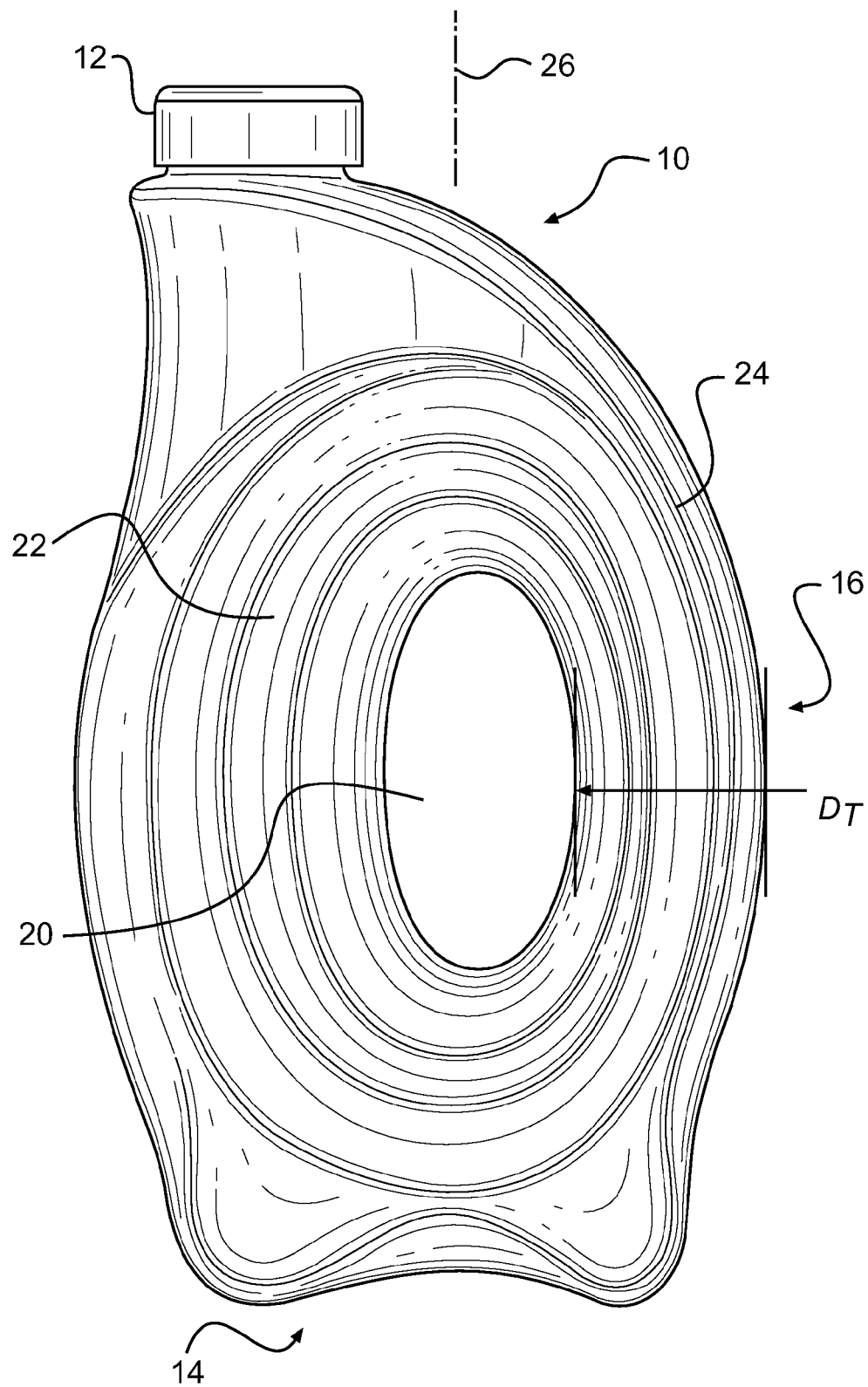
FIG. 2 is a front elevational view of the container that is shown in FIG. 1.
Figure 3:
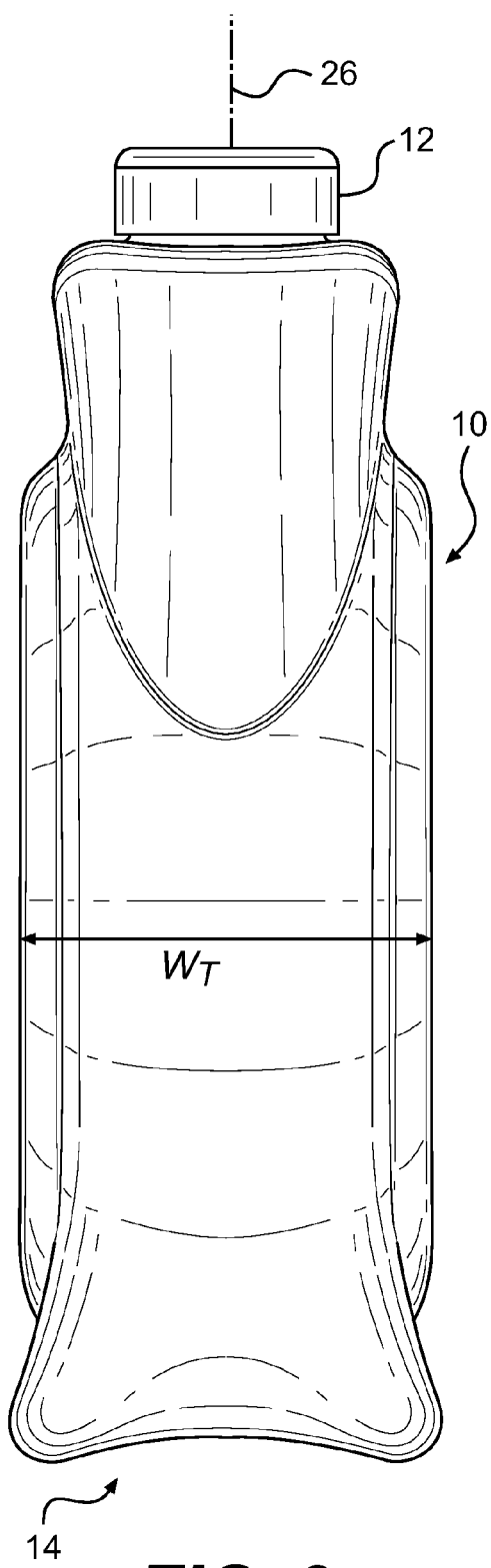
FIG. 3 is a first side elevational view of the container that is shown in FIG. 1.
Figure 4:
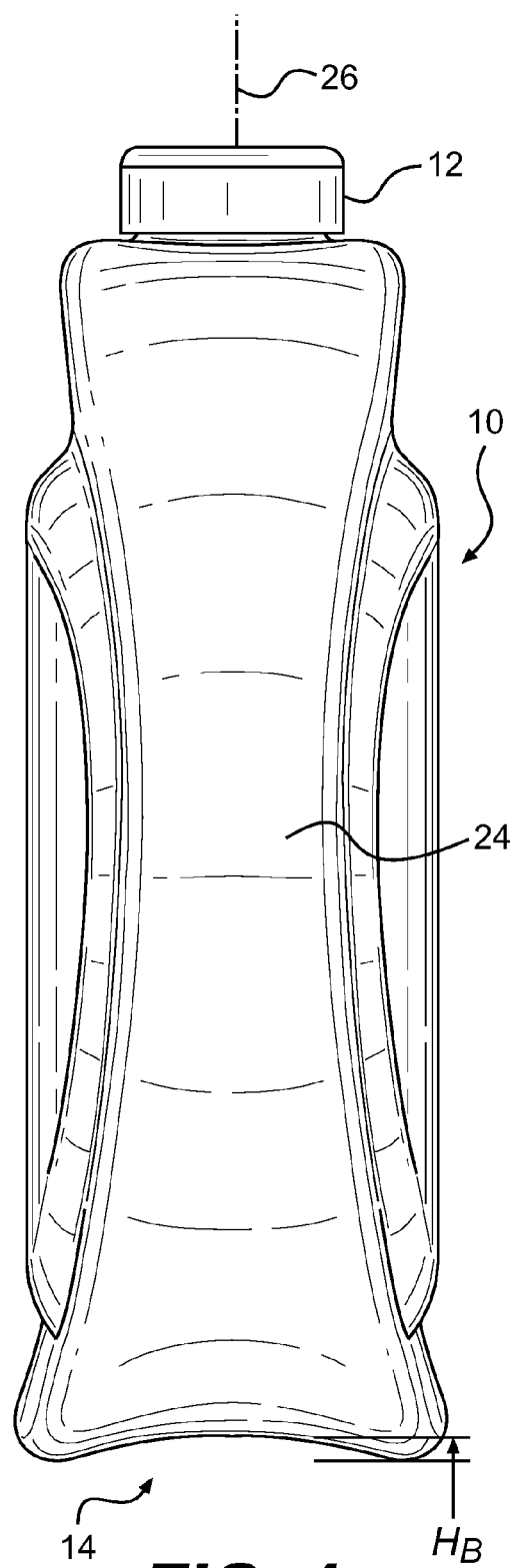
FIG. 4 is a second side elevational view of the container that is shown in FIG. 1.
Figure 5:
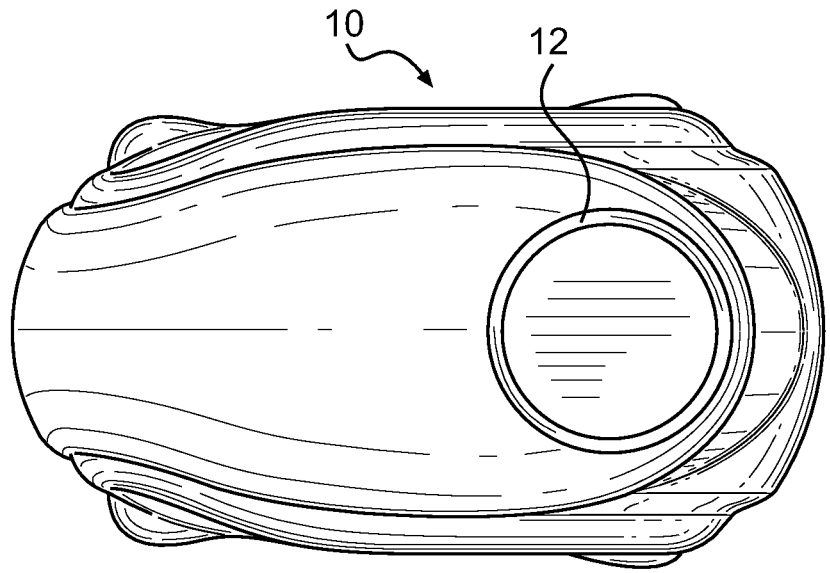
FIG. 5 is a top plan view of the container that is shown in FIG. 1.

As FIG. 1 shows, container 10 further includes a generally toroidal central body portion 22 that substantially surrounds the central opening 20. The generally toroidal central body portion 22 forms one portion of a handle 24, and is shaped and sized so as to facilitate gripping by a consumer. In order to facilitate secure gripping by a consumer, it preferably has a width $W_T$ as viewed in side elevation in FIG. 3 that is within a range of about 1.2 inches to about 3.2 inches and a depth DT as viewed in FIG. 2 that is within a range of about 1.8 inches to about 3.2 inches.

The main body portion 16 of the container 10 includes a central longitudinal axis 26 that extends through the center of mass of the container 10 as viewed in top plan. According to one advantageous aspect of this embodiment of the invention, the neck portion 12 is offset from the central longitudinal axis 26. This facilitates efficient and convenient pouring of liquid by a consumer from the container 10 through the neck portion 12 while the consumer is holding the handle 24.

Figure 6:
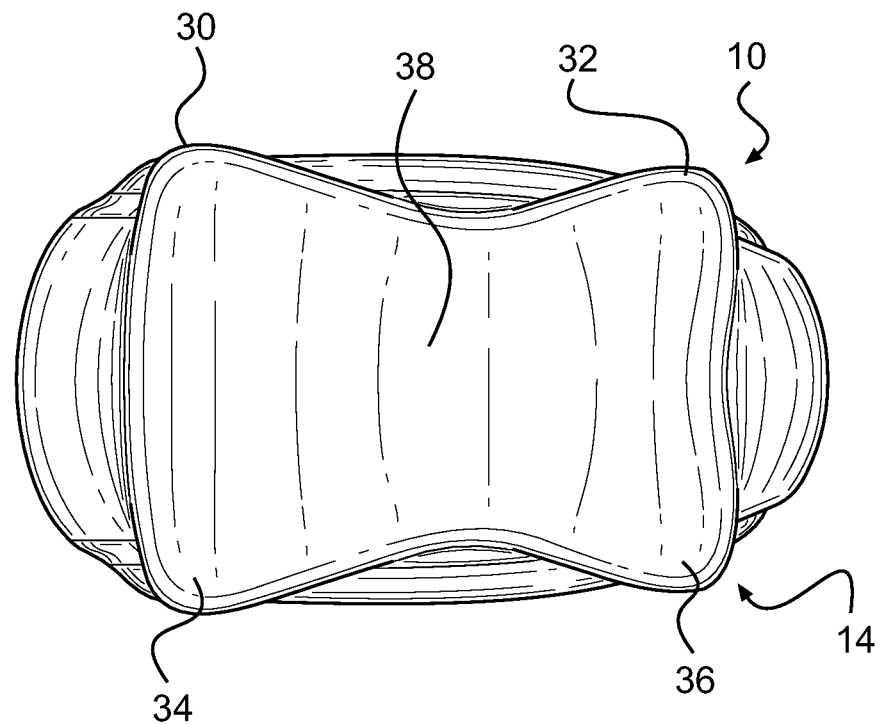
FIG. 6 is a bottom plan view of the container that is shown in FIG. 1.

Referring now to FIG. 6, the bottom portion 14 of the container 10 includes a plurality of integrally molded support feet 30, 32, 34, 36 that are adapted to support the container 10 on an underlying flat horizontal surface. Bottom portion 14 further preferably includes a substantially smooth central raised portion 38 that in the preferred embodiment is slightly concave and that is constructed so as to have no significant discontinuities, such as a gate well that is commonly found in stretch blow molded PET containers. The smooth central raised portion 38 and the lack of significant discontinuities provides a pleasing aesthetic effect in addition to permitting relative lightweighting of the container 10 by the efficient distribution of material within the container bottom portion 14. Smooth central raised portion 38 is preferably raised a vertical distance $H_B$ with respect to the lowermost extent of the feet 30, 32, 34, 36 that is most preferably within a range of about 0.2 inch to about 0.75 inch.

Figure 7:
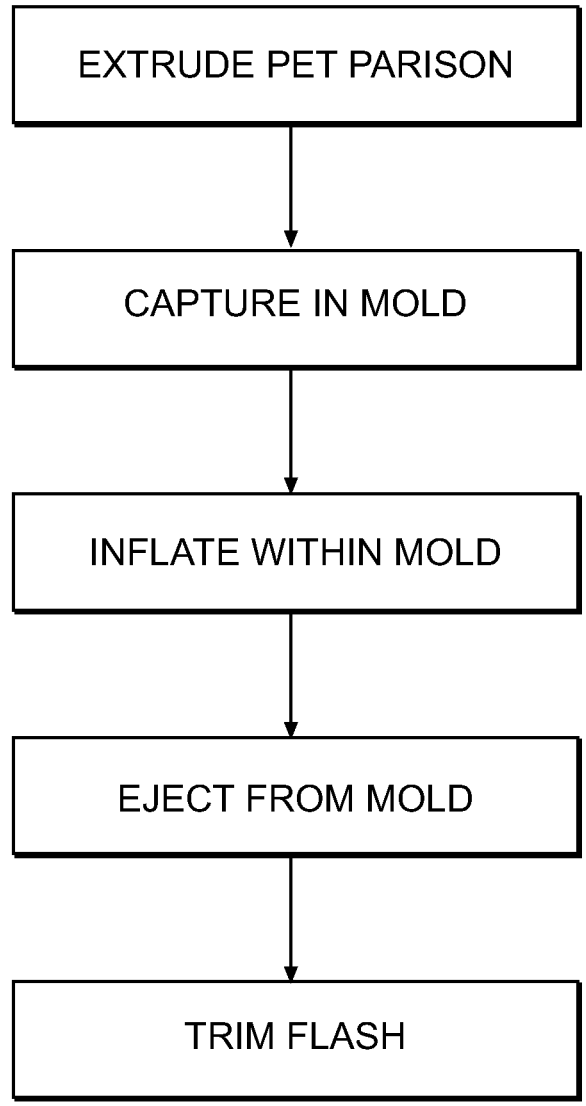
FIG. 7 is a flow chart depicting a method that is performed according to the preferred embodiment of the invention.

As is shown schematically in FIG. 7, container 10 is manufactured using an extrusion blow molding process. This may be performed on any of several known types of extrusion blow molding machines, such as an extrusion blow molding rotary wheel or an extrusion blow molding shuttle system. However, because of the chemical nature of the extrudable PET material, the extrusion blow molding machine must be constructed so as to limit the exposure of the extruded parison to moisture or humidity. This can be done by shrouding, using a shroud to control the composition and relative humidity of the ambient gaseous environment in the area of the mold.

Manufacture of the container 10 is preferably effected by continuously extruding a PET parison from an extrusion nozzle, and periodically capturing a portion of the extruded parison within a movable mold in a manner that is conventional for extrusion blow molding processes. The movable mold will typically have two mold portions or halves that close about the captured portion of the parison.

A pressurized gas is introduced to the interior of the captured portion of the parison within the mold in order to inflate the captured portion of the parison and force it against the inner walls of the mold so that it conforms to the mold walls. This creates a container blank that includes a central recess in the main body portion 16 corresponding to the final position of the central opening 20 that is closed with flash material, as well as additional flash material in the areas that corresponding to the seam that exists between the two mold portions.

The container blank is cooled within the mold and then is ejected from the mold. It is subsequently subjected to a flash trimming process in order to remove the flash that is in the central recess of the main body portion 16, thereby forming the central opening 20 that extends through the main body portion 16 of the container 10. Flash material is also trimmed from the areas that correspond to the seam between the two mold portions, including from the bottom portion 14 of the container 10.

The container 10 is then filled with product, capped with a closure and distributed to consumers.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a plastic container, comprising:
   continuously extruding a parison fabricated from a material comprising polyethylene terephthalate (PET);
   capturing a portion of the parison within a mold;
   inflating the captured portion of the parison against the mold to form a container blank having a main body portion having a central recess closed with flash; and
   trimming the flash from the central recess of the container blank to form a PET container having a main body portion including a liquid holding central toroidal portion forming part of a handle shaped and sized to facilitate gripping and defining a central opening substantially surrounded by the central toroidal portion extending completely through the container, the handle having a first maximum width and an opposing portion of the liquid holding central toroidal portion having a second maximum width greater than the first maximum width.

2. A method of making a plastic container according to claim 1, wherein the generally toroidal body portion has a width that is within a range of about 1.2 inches to about 3.2 inches.

3. A method of making a plastic container according to claim 2, wherein the generally toroidal body portion has a depth that is within a range of about 1.8 inches to about 3.2 inches.

4. A method of making a plastic container according to claim 1, wherein the container blank further has a finish portion that is offset from a central longitudinal axis of the container blank.

5. The method of making a plastic container according to claim 1, wherein the central toroidal portion extends laterally outwardly relative the first and second sidewalls.

6. The method of making a plastic container according to claim 1, wherein the container further has a bottom portion extending from the main body portion and defining a plurality of support feet.

7. The method of making a plastic container according to claim 6, wherein the plurality of support feet are disposed on each of a first side of the bottom portion having a first width and an opposing second side of the bottom portion having a second width greater than the first width.

8. The method of making a plastic container according to claim 6, wherein the bottom portion further includes a smooth central raised portion defined therein.

9. The method of making a plastic container according to claim 1, wherein the handle has a first maximum depth and the opposing portion has a second maximum depth greater than the first maximum depth.

10. A method of making a plastic container, comprising:
continuously extruding a parison fabricated from a material comprising polyethylene terephthalate (PET);
limiting exposure of the material to moisture;
capturing a portion of the parison within a mold;
inflating the captured portion of the parison against the mold to form a container blank having a main body portion having a central recess closed with flash; and
trimming the flash from the central recess of the container blank to form a PET container having a main body portion including a liquid holding part central toroidal portion forming part of a handle shaped and sized to facilitate gripping and defining a central opening extending completely therethrough, the handle having a first maximum width and an opposing portion of the liquid holding central toroidal portion having a second maximum width greater than the first maximum width.

11. A method of making a plastic container according to claim 1, wherein limiting exposure of the material to moisture comprises creating a shroud to control the relative humidity of ambient gaseous environment proximate the mold.

12. A method of making a plastic container according to claim 10, wherein the generally toroidal body portion has a depth that is within a range of about 1.2 inches to about 3.2 inches.

13. The method of making a plastic container according to claim 10, wherein the main body portion has a central toroidal portion extending laterally outwardly relative the first and second sidewalls.

14. The method of making a plastic container according to claim 10, wherein the container further has a bottom portion extending from the main body portion and defining a plurality of support feet.

15. The method of making a plastic container according to claim 14, wherein the plurality of support feet are disposed on each of a first side of the bottom portion having a first width and an opposing second side of the bottom portion having a second width greater than the first width.

16. The method of making a plastic container according to claim 14, wherein the bottom portion further includes a smooth central raised portion defined therein.

17. The method of making a plastic container according to claim 10, wherein the handle has a first maximum depth and the opposing portion has a second maximum depth greater than the first maximum depth.

* * * * *